Sept. 29, 1953 W. M. SHEEHAN 2,653,829
MOTOR CRANE UNDERFRAME
Filed Jan. 9, 1950 3 Sheets-Sheet 1
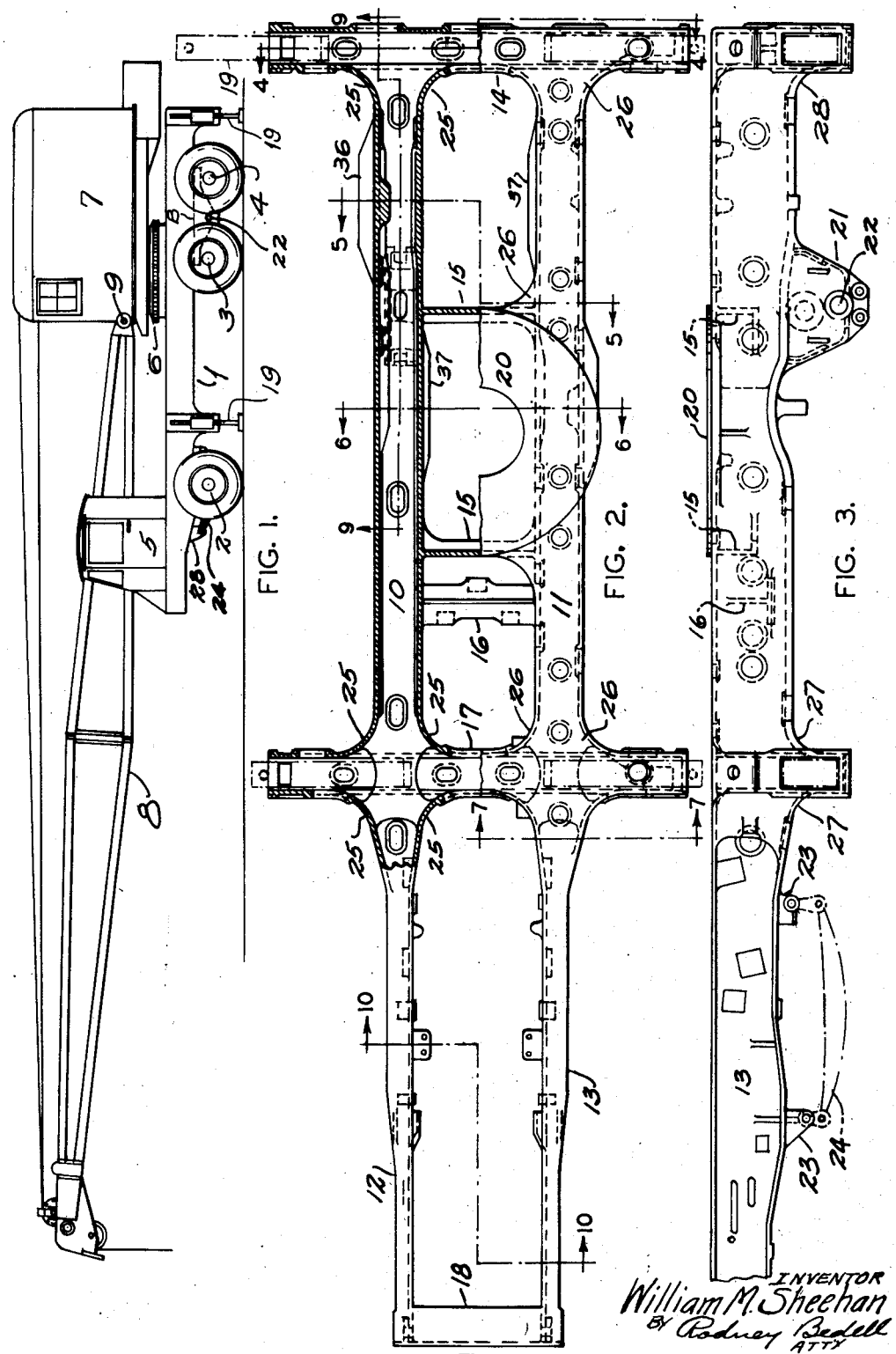
INVENTOR
William M. Sheehan
BY Rodney Bedell
ATTY Sept. 29, 1953 W. M. SHEEHAN 2,653,829
MOTOR CRANE UNDERFRAME
Filed Jan. 9, 1950 3 Sheets-Sheet 2

INVENTOR
William M. Sheehan
BY Rodney Bedell
ATTY.

Sept. 29, 1953 W. M. SHEEHAN 2,653,829
MOTOR CRANE UNDERFRAME

Filed Jan. 9, 1950 3 Sheets-Sheet 3

INVENTOR
William M. Sheehan
By Rodney Bedell
ATTY.

Patented Sept. 29, 1953

2,653,829

UNITED STATES PATENT OFFICE 2,653,829

MOTOR CRANE UNDERFRAME

William M. Sheehan, Philadelphia, Pa., assignor to General Steel Castings Corporation, Granite City, Ill., a corporation of Delaware Application January 9, 1950, Serial No. 137,505

9 Claims. (Cl. 280—106)

The invention relates to cranes of the type in which an elongated boom is pivotally mounted at one end on a movable frame from which it may be extended in different directions a substantial distance beyond the frame in any desired direction. The frame may be a part of the chassis of a vehicle adapted to travel over ordinary highways.

The invention lies primarily in the frame on which the boom and its manipulating mechanism is mounted, and the invention consists in a frame structure formed of a one piece casting including major sections extending transversely of each other and so merging with each other and so proportioned that they will carry the necessary loads and resist the torsional and other stresses to which the frame may be subjected without undue weight of metal or reduction of strength required for relatively movable operating parts.

One object of the invention is to avoid the labor and additional material required for building up a frame of structural shapes which must be specially formed and welded or riveted together.

Another object is to construct a frame which will be lighter than one built up of structural steel and having a corresponding size and strength. With the current and prospective restrictions on permissible wheel loads on highways, minimum weight is extremely essential.

Another object is to simplify the assembly with the frame of a turntable for mounting the boom and its actuating engine, and for mounting outriggers for stabilizing the crane while in operation.

In the accompanying drawings illustrating a selected embodiment of the invention, Figure 1 is a side view, largely diagrammatic of a complete crane unit embodying the frame forming the subject matter of the present invention and other chassis parts and the cab and boom structure mounted thereon.

Figure 2 is in part a top view of the chassis frame and in part a horizontal section taken on the line 2—2 of Figure 4.

Figure 3 is a side view of the frame shown in Figure 2.

Figure 4:
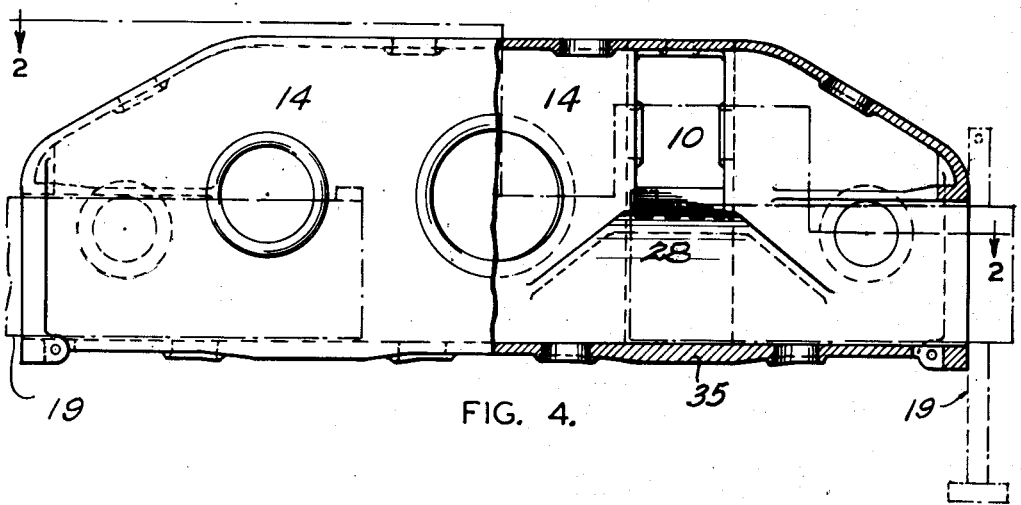
Figure 4 is in part a view looking at the right hand end of the frame shown in Figures 2 and 3 and in part a vertical section taken upon the line 4—4 of Figure 2.
Figure 5:
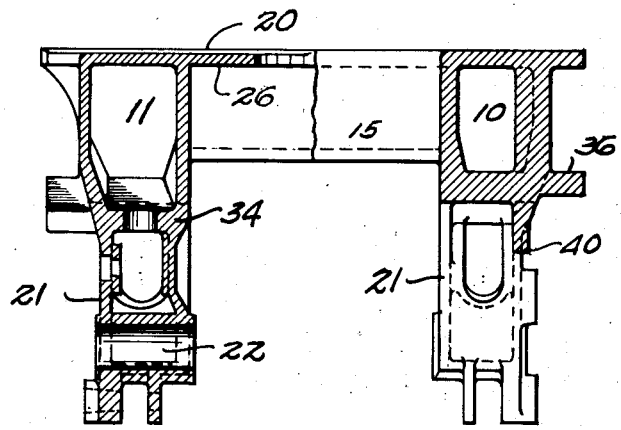
Figure 6:
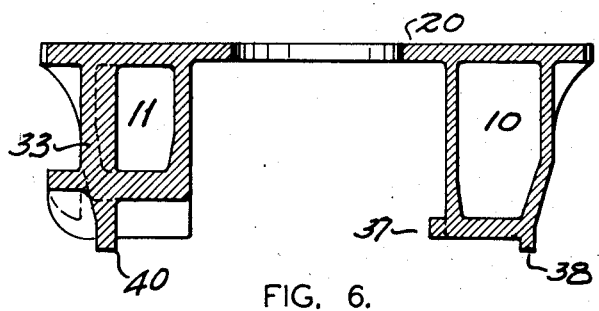
Figure 10:
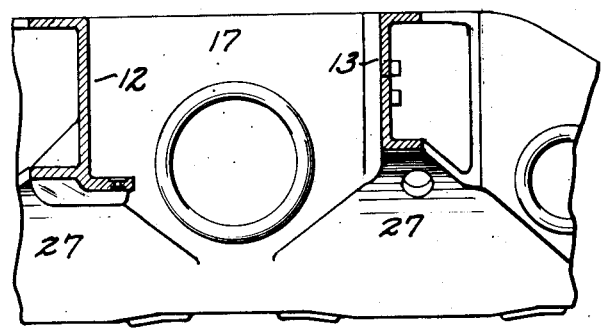

Figures 5, 6, and 10 are transverse vertical sections taken on the corresponding section lines of Figure 2.

Figure 7:
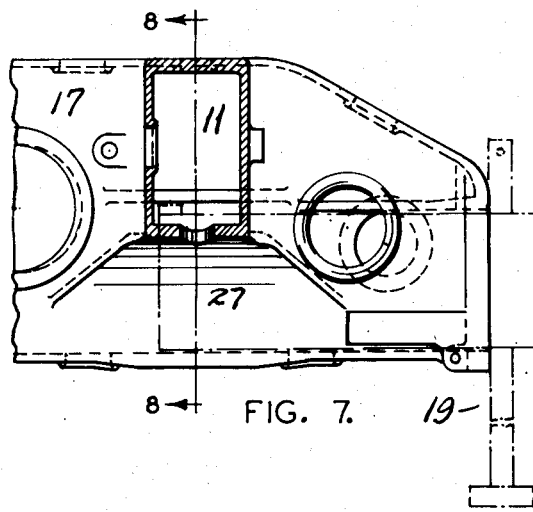

Figure 7 is a detailed transverse section looking in the opposite direction and taken on the line 7—7 of Figure 2.

Figure 8:
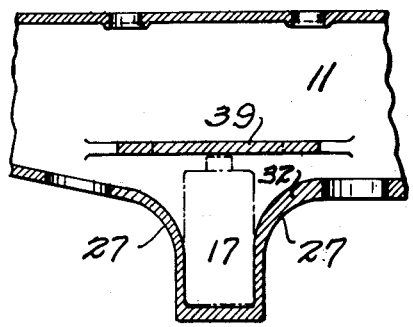

Figure 8 is a detailed section extending longitudinally of the frame and taken on the line 8—8 of Figure 7.

Figure 9:
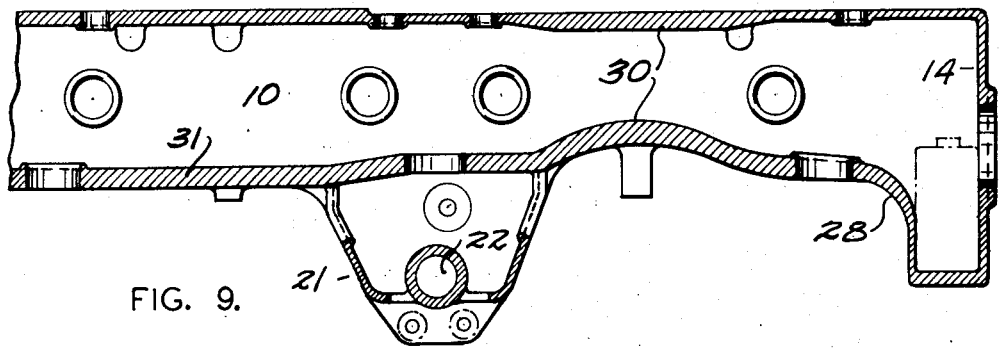

Figure 9 is a detailed longitudinal vertical section taken on the line 9—9 of Figure 2.

The frame 1 is mounted upon a plurality of wheeled axles 2, 3, and 4 and mounts a driver's cab 5 near its forward end, a turntable structure 6 and an operator's cab 7 near its rear end. The crane boom 8 is pivoted at 9 to the turntable.

The chassis frame includes two main longitudinal members, each consisting of a relatively heavy rear portion and a relatively light forward portion. The relatively heavy rear portions 10 and 11 are of box shape cross section (Figures 5, 6, and 7) and the relatively light forward portions 12 and 13 are of channel shape cross section (Figure 10).

Transverse members 14, 15, 16, 17, and 18 connect the main longitudinal members. Transverse members 14 and 17 are of box shape cross section and transverse members 15 are of channel cross section. Transverse member 16 is of inverted T section. Forward transverse member 18 is of angular section with a horizontal web uniting the upper portions of forward members 12 and 13.

Transverse members 14, 17 are substantially deeper than longitudinal members 10, 11 and project a substantial distance outwardly from the main longitudinal members 10, 11 and form box section housings for outriggers indicated at 19, which may be retracted during crane travel and projected during crane use. A heavy horizontal web 20, circular in contour, merges with the top walls of longitudinal members 10, 11 and forms a platform for the turntable 6.

Box section brackets 21 extend downwardly from main longitudinal members 10, 11 adjacent the rear of circular web 20 and include integral cylindrical bearings 22 for journaling trunnions on equalizing bars B which mount rear wheel axles 3 and 4. Brackets 23 depend from forward portions 12 and 13 of the main longitudinal members to suspend the shackles for leaf springs 24 which support the front end of the frame on axle 2.

Where the main longitudinal members 10, 11 and transverse members 14, 17 intersect, their upright webs merge in curved sections 25. The top walls of the intersecting members merge in gusset-like sections 26. The bottom walls of the longitudinal members curve downwardly and merge with the front and rear walls of transverse member 17 and with the front wall of transverse member 14 in arcuate sections 27, 28, respectively. Preferably, the radii of all of the arcuate sections correspond to the width of the adjacent portions of the main members.

Throughout the rear portion of the chassis frame, both horizontal and upright webs are enlarged in thickness at points where stresses are increased as indicated for example at 30, 31, 32, 33, 34, 35. Reenforcing ribs are formed integrally with the frame as indicated for example at 36, 37, 38, 39, 40.

The curved gussets and webs, the thickening of the webs at strategic points and the provision of additional reenforcing ribs where advisable make it possible to form a very rigid structure, without unnecessary thickness of metal where it is not required, which will withstand the bending moments and twisting which are applied to the frame during the operation of the crane irrespective of the shifting of the moments and torsional strains amounting to the loads on the crane and various positions of the swinging pull. This shaping and distribution of the metal in a one-piece casting not only makes it possible to effect the desired results by using a minimum of metal for given load requirements, but avoids abrupt changes in sections, with resultant concentration of stresses, and avoids localization of stresses at corners, as where welding is resorted to or, alternately, expensive punching, drilling and riveting operations and, of course, the inefficient use of metal where overlapping plates and shapes are utilized to build up the frame, as has been the practice heretofore.

The provision of the necessary strength while using a minimum amount of metal minimizes the total load on the vehicle wheels and on the highway over which the crane is operated and makes for a greater safety factor for the highway than would be possible with the heavier frame required in a built-up structure.

Some of the features embodied in the preferred construction illustrated and described may be used without necessarily associating therewith the other features shown and described and the details of the structure may be modified substantially without departing from the spirit of the invention and the exclusive use of those modifications coming within the scope of the claims is contemplated.

What is claimed is:

1. In a motor crane chassis frame, main longitudinal members and transverse members of box-like cross section of substantial width and depth and positioned at substantially the same general level with portions intersecting each other, the intersecting portions comprising upright arcuate webs, each having a radius corresponding generally to the width of the adjacent box-like portions of the members, and a turntable horizontal platform extending between the main longitudinal members intermediate said transverse members and having depending webs merging with said longitudinal members, said members, arcuate webs and platform being formed in a one piece metal casting.

2. In a motor crane chassis frame, main longitudinal members and transverse members at substantially the same general level, each member varying in width and depth between its ends, portions of the longitudinal members merging with the transverse members, at least one of said transverse members including a hollow box section projecting transversely of the chassis from the main longitudinal members and forming a housing below said level for slidably receiving frame-supporting outriggers, an integral horizontal turntable platform extending between the main longitudinal members and positioned between the main transverse members, all of said structure being formed in a one piece casting.

3. A motor crane chassis frame formed of a one piece casting and including main longitudinal members of box-like cross section varying in width and depth between their ends and a turntable platform which forms a portion of the top walls of said longitudinal members but projects outwardly from the outer side walls of said longitudinal members, and transverse vertical webs extending between and merging with the inner walls of said longitudinal members, and other transverse vertical webs extending outwardly from the outer side walls of the longitudinal members and merging therewith.

4. In a motor crane chassis frame, main longitudinal members of box-like cross section varying in width and depth between their ends, a turntable horizontal platform extending between said longitudinal members, there being box-like brackets formed integrally with and depending from the main longitudinal members beneath the turntable platform and provided with bearings for traction wheel mountings, all of said structure comprising a one piece metal casting.

5. In a motor crane chassis frame, main longitudinal members spaced apart and each having a box cross section, a transverse member extending between and outwardly from said longitudinal members and being of box cross section and lying in the same general plane as said longitudinal members but having a depth substantially greater than the depth of said longitudinal members, arcuate webs merging the inner and outer side walls of said longitudinal members with the side walls of said transverse member between the longitudinal members and outwardly of the longitudinal members, respectively, and arcuate webs merging the bottom walls of said longitudinal members with the lower portions of both side walls of said transverse member.

6. In a motor crane chassis frame, main longitudinal members of box-like cross section spaced apart, a turntable horizontal platform formed in part by the top walls of said members and extending therefrom across the space between said members, vertical webs between said members and merging therewith and with said platform, and box section extensions depending from said members below said platform and forming structure for mounting supporting wheel and axle structure, said members, platform, webs and extensions being formed in an integral cast metal unit.

7. A motor crane chassis frame comprising a unitary cast metal unit including a pair of spaced apart main longitudinal members, each of which has throughout a portion of its length relatively heavy box-like sections and throughout the remainder of its length has a relatively light single vertical web section, spaced apart main transverse members of box-like section connecting and extending outwardly from the relatively heavy box-like section portions of the longitudinal members, a turntable platform between said transverse members and extending between and merging with the box-like sections of the longitudinal members, axle mounting structure depending from said box-section portions of the longitudinal members below said platform and having bearings for mounting traction wheel and axle structure, said transverse members forming housings for retractable outriggers, and elements on said relatively light portions of said heavy members for connecting the frame to supporting wheel and axle structure.

8. In a motor crane chassis frame, main longitudinal members and transverse members of boxlike cross section of substantial width and depth and positioned at substantially the same general level with portions intersecting each other, and a turntable horizontal platform extending between the main longitudinal members at substantially the same general level, said members and platform being formed in a one piece metal casting.

9. In a motor crane chassis frame, main longitudinal members and a transverse member extending between and outwardly beyond said longitudinal members and being substantially hollow and of greater depth than said longitudinal members and including a bottom web spaced below said longitudinal members and extending horizontally substantially from end to end of said transverse member and constructed and arranged to mount a horizontally slidable frame-supporting outrigger.

WILLIAM M. SHEEHAN.

References Cited in the file of this patent

UNITED STATES PATENTS

| Number | Name | Date |
|---|---|---|
| 780,369 | De Montgolfier | Jan. 17, 1905 |
| 1,473,651 | Smith | Nov. 13, 1923 |
| 1,737,810 | Tarbox | Dec. 3, 1929 |
| 1,843,422 | Henry | Feb. 2, 1932 |
| 1,872,506 | Sage | Aug. 16, 1932 |
| 1,948,256 | Cease | Feb. 20, 1934 |
| 2,144,760 | Harnischfeger | Jan. 24, 1939 |
| 2,194,349 | Almdale | Mar. 19, 1940 |